United States Patent
Schmid et al.

(10) Patent No.: US 11,670,201 B2
(45) Date of Patent: Jun. 6, 2023

(54) METHOD AND DEVICE FOR INFLUENCING AN OPTICAL OUTPUT OF IMAGE DATA ON AN OUTPUT DEVICE IN A VEHICLE

(71) Applicant: DAIMLER AG, Stuttgart (DE)

(72) Inventors: Thomas Schmid, Nufringen (DE); Holger Enzmann, Altdorf (DE); Christian Patzelt, Stuttgart (DE); Gerd Gulde, Ammerbuch (DE); Nina Hallier, Schönaich (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 102 days.

(21) Appl. No.: 17/600,656

(22) PCT Filed: Mar. 16, 2020

(86) PCT No.: PCT/EP2020/057060
§ 371 (c)(1),
(2) Date: Oct. 1, 2021

(87) PCT Pub. No.: WO2020/200720
PCT Pub. Date: Oct. 8, 2020

(65) Prior Publication Data
US 2022/0198971 A1 Jun. 23, 2022

(30) Foreign Application Priority Data
Apr. 2, 2019 (DE) .................... 10 2019 002 403.6

(51) Int. Cl.
*G09G 3/00* (2006.01)
*G06V 40/18* (2022.01)
(Continued)

(52) U.S. Cl.
CPC ............. *G09G 3/002* (2013.01); *B60K 35/00* (2013.01); *G06F 3/013* (2013.01); *G06V 40/18* (2022.01);
(Continued)

(58) Field of Classification Search
CPC ........... G09G 3/002; G09G 2320/0626; G09G 2340/14; G09G 2354/00; G09G 2380/10;
(Continued)

(56) References Cited

U.S. PATENT DOCUMENTS

| 5,208,903 A * | 5/1993 | Curry | .................... G06F 3/0481 |
| | | | 715/781 |
| 2012/0215403 A1* | 8/2012 | Tengler | .................. B60K 35/00 |
| | | | 701/36 |

(Continued)

FOREIGN PATENT DOCUMENTS

| DE | 102011084887 A1 | 4/2013 |
| DE | 102016007493 A1 | 2/2017 |

OTHER PUBLICATIONS

International Search Report dated May 27, 2020 in related/corresponding International Application No. PCT/EP2020/057060.

(Continued)

*Primary Examiner* — Christopher E Leiby
(74) *Attorney, Agent, or Firm* — Patent Portfolio Builders PLLC

(57) ABSTRACT

A method and a system for influencing an optical output of image data on an output device in a vehicle. A viewing direction of a driver of the vehicle is determined. If the determined viewing direction is directed to the output device, the optical output of the image data is faded down with an average fading out rate DOWN. The fading out rate DOWN defines a temporal decrease in the optical perceptibility of the output image data by a human. If the deter- (Continued)

Figure 1:
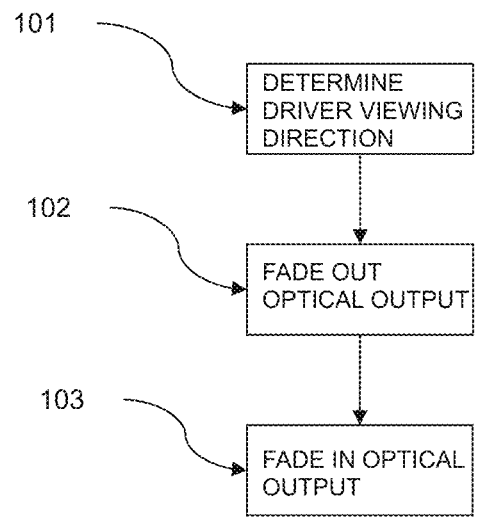

mined viewing direction is directed towards the output device and is directed away from the output device, the optical output of the image data is faded up with an average fading in rate UP. The fading in rate UP defines a temporal increase of the optical perceptibility of the output image data by a human.

9 Claims, 2 Drawing Sheets

(51) Int. Cl.
*B60K 35/00* (2006.01)
*G06F 3/01* (2006.01)
(52) U.S. Cl.
CPC .................. *B60K 2370/149* (2019.05); *B60K 2370/1529* (2019.05); *B60K 2370/21* (2019.05); *B60K 2370/33* (2019.05); *G09G 2320/0626* (2013.01); *G09G 2340/14* (2013.01); *G09G 2354/00* (2013.01); *G09G 2380/10* (2013.01)
(58) Field of Classification Search
CPC .............. B60K 35/00; B60K 2370/149; B60K 2370/1529; B60K 2370/21; B60K 2370/33; B60K 2370/1868; B60K 2370/1876; G06F 3/013; G06F 3/04847; G06V 40/18

See application file for complete search history.

(56) References Cited

U.S. PATENT DOCUMENTS

| | | | |
|---|---|---|---|
| 2015/0015460 A1* | 1/2015 | Kobayashi | G02B 27/017 345/8 |
| 2016/0152182 A1* | 6/2016 | Aoki | G08G 1/166 340/435 |
| 2018/0229654 A1* | 8/2018 | Unver | G06V 20/597 |
| 2019/0126730 A1* | 5/2019 | Chelian | B60R 1/04 |
| 2019/0220088 A1* | 7/2019 | Ishii | G06F 1/1694 |
| 2020/0088542 A1* | 3/2020 | Feyereisen | B64D 43/02 |
| 2021/0232278 A1* | 7/2021 | Heber | B60K 35/00 |
| 2022/0055497 A1* | 2/2022 | Yamanaka | H02J 7/0047 |

OTHER PUBLICATIONS

Written Opinion dated May 27, 2020 in related/corresponding International Application No. PCT/EP2020/057060.

* cited by examiner

METHOD AND DEVICE FOR INFLUENCING AN OPTICAL OUTPUT OF IMAGE DATA ON AN OUTPUT DEVICE IN A VEHICLE

BACKGROUND AND SUMMARY OF THE INVENTION

Exemplary embodiments of the invention relate to a method and device for influencing an optical output of image data on an optical output device in a vehicle, in particular in a motor vehicle, and to a vehicle having such a device.

The reproduction of image data, in particular moving images, such as: videos, animations, clips etc. on optical output devices that can be viewed by the driver of the vehicle, is not permitted in numerous countries for safety reasons during operation of the vehicle due to the high distraction potential for the respective driver.

In order to nevertheless enable the reproduction of image data by means of such an optical output device, for example for a passenger sitting next to the driver, a method and a device for influencing the attention of a driver of a motor vehicle is known, for example, from the printed publication DE 10 2011 084 887 A1, which comprises a system having an optical output device.

The method disclosed in this printed publication comprises the steps: determining that the driver of the vehicle is directing his/her attention towards the output device, and if a measure characteristic of the temporal extent and/or the frequency with which the driver directs his/her attention to the output device reaches or exceeds a certain threshold value, fading out information on the output device. This means that the information output on the output device is not visible to either the driver or the passenger, such that the driver is encouraged to direct his/her attention away from the user interface and back onto the road.

The information on the output device can be faded out according to the above-mentioned document in the case of a screen as an output device by simply deleting the entire screen content. It is also possible to fade out, in particular delete, only some or several parts of the screen content, for example those relating to individual functions.

Exemplary embodiments of the invention are directed to developing the method or the device according to the printed publication DE 10 2011 084 887 A1 in such a way that the user-friendliness and thus also the road safety are increased.

A first aspect of the invention relates to a method for influencing an optical output of image data on an output device in a vehicle, having the following steps:
  in the vehicle, determining a viewing direction of a driver of the vehicle,
  if the determined viewing direction is directed to the output device, fading out the optical output of the image data with an average fading out rate DOWN, wherein the fading out rate DOWN defines a temporal decrease in the optical perceptibility of the output image data by a human, and
  if the determined viewing direction is directed towards the output device and is then directed away from the output device, fading out the optical output of the image data with an average fading out rate UP, wherein the fading out rate UP describes a temporal increase in the optical perceptibility of the output image data by a human.

The term "image data" is understood broadly in the present case. It comprises the output of alphanumeric symbols, graphics, images, video images, TV images, Internet content, vehicle data, navigation data of the vehicle etc. Advantageously, the optically output image data includes data DAT1 relevant to vehicle navigation and other image data DAT2. For example, the data DAT2 can comprise video content, Internet content, and/or photo content, and the data DAT1 can comprise dynamics data and/or navigation data and/or other data for guiding the vehicle and/or controlling systems of the vehicle.

The term "output device" for optically outputting image data is understood broadly in the present context. The output device basically comprises all devices known today for the optical output of image data, such as: FED, LCD, TFT, LCD, CRT, plasma, OLED or SED displays, touch screens, and LED, laser projection systems, in particular HUDs (Head UP Displays).

The term "vehicle" is understood broadly in this context. It comprises in particular land vehicles (motor vehicles, busses, lorries, etc.), aircraft, water vehicles, underwater vehicles, rail vehicles.

In the present case, the term "viewing direction" of the driver describes the direction in which the driver is currently looking with his/her eyes.

In the present case, the term "fading out" describes that the perceptibility of image data displayed optically on the output device is reduced, in particular gradually or stepwise. The process of fading out preferably takes place over a predetermined period of time>0 and, once it has proceeded undisturbed, results in a person no longer being able to see any image data on the output device.

The term "average fading out rate, DOWN" describes the reduction in the perceptibility of the optically displayed image data averaged over time. It is assumed here that before fading out of image data takes place, image data optically displayed on the output unit basically have a perceptibility of 100%, in that, for example, the image data to be displayed are displayed in an optimum pixel resolution, optimum selectivity, optimum brightness, etc. for the output unit, such that an optimum perceptibility is given.

In the present case, the term "fading in" describes that the perceptibility of image data optically displayed on the output device is increased or improved, in particular gradually or stepwise.

The term "average fading in rate, UP" describes the increase/improvement of the perceptibility of the optically displayed image data averaged over time.

In the present case, "fading in" is thus the opposite of "fading out". Furthermore, "fading in" requires that the perceptibility of the displayed image data has been at least partially reduced beforehand, i.e., faded out. The process of fading in preferably takes place over a predetermined period of time>0 and, after its undisturbed completion, results in image data displayed by a human on the output device being recognizable with a perceptibility of 100%.

In the proposed method, the viewing direction of the driver is thus determined in particular during operation of the vehicle, advantageously continuously, and it is checked whether the viewing direction and thus the driver's attention is directed to the output device. If it is detected that the driver is looking in the direction of the output device, image data displayed optically on the output device is faded out at an average fading out rate DOWN. This encourages the driver to turn his/her gaze away from the output device and back to the traffic situation.

If the driver looks at the output device and turns his/her gaze away from the output device (at first no matter where), the optical output of the image data is faded in with an average fading in rate UP according to the invention.

The method is advantageously used whenever the vehicle is travelling faster than a predetermined speed≥0.

On the one hand, this ensures that the driver is encouraged to direct his/her attention to guiding the vehicle and not to the output device during operation or, in particular, during driving of the vehicle. On the other hand, this allows a passenger positioned next to the driver to view the optical outputs of the image data on the output device.

If a passenger is present at all, he/she will, if he/she is interested in viewing the optically output image data, additionally exert a certain psychological pressure on the driver, which causes the driver not to look at the output device, such that an undisturbed viewing of the output image data by the passenger is possible. Overall, this results in a user-friendly influence on the optical output on the one hand, and further increases road safety on the other.

In a development of the proposed method, the optical output of the image data is faded in only when the driver directs his/her attention to predetermined areas, such as the traffic ahead.

In a particularly advantageous development of the proposed method, the following applies: UP>DOWN, i.e., the rate at which the perceptibility of the displayed image data is reduced is smaller than the rate at which the perceptibility of image data whose perceptibility is reduced is increased.

Advantageously, the output device is a display arranged in the vehicle in such a way that the output image data is visible, in particular, to a passenger positioned next to the driver.

Advantageously, the output device is a head-up display that projects image data that is visible to a passenger positioned next to the driver.

Advantageously, the image data is faded out and faded in only for the data DAT2, i.e., only for image data that is not used for vehicle guidance/vehicle navigation.

Advantageously, the viewing direction is determined by a camera system designed and equipped to capture pupil positions of the driver's eyes and to determine the viewing direction on the basis of the pupil positions. Advantageously, the camera system is arranged in the area of the dashboard in front of the driver and/or in the region of the vehicle headliner in front of the driver. Advantageously, the camera system comprises a stereo camera.

An advantageous development of the proposed method is characterized in that the decrease or increase in the perceptibility of the output image data is brought about by a decrease or increase in a light intensity LI of the image data output. Advantageously, for this purpose the light intensity LI of the image data output can be varied between 0 and a predetermined maximum value $LI_{MAX}$: $LI \in [0, \ldots, LI_{MAX}]$.

Additionally, or alternatively, the decrease or increase of the perceptibility of the output image data is caused by an increase or decrease of a blur of the image data output. Advantageously, the blurring is caused by a defocusing of the output image data and/or by a superposition of the output image data with image data generating a surface with variable transparency. Thus, in the case of a complete fading out of the image data, the transparency of the surface is zero, i.e., for example, only a homogenous color surface is shown, but no image data is output.

An advantageous development of the proposed method is characterized in that the fading out of the optical output of the image data is implemented with a step function $T_{FADING\ OUT}(t)$, in which the light intensity LI is reduced stepwise and/or in which the blurring of the image data output is increased stepwise.

An advantageous development of the proposed method is characterized in that the fading in of the optical output of the image data is implemented with a step function $T_{FADING\ IN}(t)$, in which the light intensity LI is increased stepwise and/or in which the blurring of the image data is reduced stepwise.

Advantageously, the step function $T_{FADING\ OUT}(t)$ and/or $T_{FADING\ IN}(t)$ is implemented with equidistant support points $t=t_0=t_0+(n-1)*\Delta t$, with n=0, 1, 2, . . . to a start time, and $\Delta t$ a predetermined time step.

An advantageous development of the proposed method is characterized in that a frequency is determined at which the driver's viewing direction is directed towards the output unit, and/or the driver's viewing direction is directed away from the output unit, wherein the fading out rate DOWN is increased as the frequency increases.

An advantageous development of the proposed method is characterized by the fact that a frequency is determined at which the driver's viewing direction is directed towards the output unit and/or the driver's viewing direction is directed away from the output unit, wherein the fading out rate DOWN is increased and/or the fading in rate UP is reduced as the frequency increases.

Advantageously, the fading out rate DOWN and/or the fading in rate UP is changed in such a way that UP>DOWN.

If the determined viewing direction is directed to the output device, the fading out of the optical output of the image data starts with an average fading out rate DOWN, advantageously with a time offset $ZV_{DOWN}$. In other words, if it is determined that at time t* that the driver is looking at the output device, fading out of the optical output of the image data does not occur until time $t=t*+ZV_{DOWN}$. If the driver only looks at the output device for a moment and then looks away again, the image data is not faded out, such that a passenger can still see the image data without a disruption. Only when the driver looks at the output device for longer than the time span $ZV_{DOWN}$ is the image data faded out.

An advantageous development of the proposed method is characterized in that, if the determined viewing direction of the driver is directed towards the output device and away from the output device, the fading in of the optical output of the image data only begins with a time offset $ZV_{UP}$. In other words, if it is determined at time t that the driver is looking away from the output device, fading in of the optical output of the image data does not occur until time $t=t+ZV_{UP}$. If the driver only looks away from the output device for a moment and then looks at it again, the image data is not faded in. Only when the driver looks away from the output device for longer than the time period $ZV_{UP}$, the fading in of the image data thus takes place.

A further aspect of the invention relates to a system with which image data can be optically output on an output device in a vehicle. The system comprises a sensor system arranged in the vehicle, which is designed and configured to determine a viewing direction of a driver of the vehicle, a control unit of the output device, which is designed and configured such that, if the determined viewing direction is directed to the output device, fading out of the optical output of the image data takes place at an average fading out rate DOWN, wherein the fading out rate DOWN defines a temporal decrease in the optical perceptibility of the output image date by a human, and if the determined viewing direction is directed towards the output device and is directed away from the output device, the optical output of the image data is faded in at an average fading in rate UP, wherein the fading in rate UP describes a temporal increase in the optical perceptibility of the output image data by a human.

Advantageously, the control unit is set up and designed in such a way that: UP>DOWN.

The optically output image data advantageously comprise only two classes of image data: firstly, data DAT1 relevant to the vehicle guidance and secondly, other data DAT2. Advantageously, the control unit is configured in such a way that the fading out and fading in of the image data only takes place for the data DAT2. Advantageously, the data DAT2 represents video content, Internet content and/or photo content, i.e., in particular image content that is used for entertainment.

Advantageously, the data DAT1 represents dynamics data and/or navigation data and/or other data that are used exclusively for guiding the vehicle and/or for controlling systems of the vehicle.

Advantageously, the output unit is a display on which image data can be output, in particular for viewing by a passenger positioned next to the driver. Alternatively, the output unit is a head-up display that projects image data that can be viewed by a passenger positioned next to the driver.

Advantageously, the sensor system comprises a camera system that is designed and set up to detect pupil positions of the driver's eyes and to determine the viewing direction on the basis of the pupil positions. For this purpose, the sensor system advantageously knows the geometry of the front area of the vehicle cabin in the direction of travel, the seat position of a driver, and the arrangement and position of the output device. Advantageously, the camera system is arranged in the area of the dashboard in front of the driver and/or in the area of the vehicle headliner in front of the driver. Advantageously, the camera system comprises a stereo camera.

Advantageously, the control unit is designed and set up in such a way that the decrease or the increase in the perceptibility of the output image data is brought about by a decrease or increase in a light intensity LI of the image data output.

Advantageously, the control unit is designed and configured in such a way that the light intensity LI of the image data output can be changed between 0 and a predetermined maximum value $LI_{MAX}$: $LI \in [0, \ldots, LI_{MAX}]$.

Advantageously, the control unit is designed and set up in such a way that the decrease or the increase in the perceptibility of the output image data is brought about by an increase or decrease in a blurring of the image data output.

Advantageously, the control unit is designed and set up in such a way that the blurring is caused by defocusing the output image data and/or by overlaying the output image data with image data that generate a surface with variable transparency.

Advantageously, the control unit is designed and set up in such a way that the fading out of the optical output of the image data is implemented with a step function $T_{FADING\ OUT}(t)$, in which the light intensity LI of the image data output is reduced stepwise, and/or in which the blurring of the image data output is increased stepwise.

Advantageously, the control unit is designed and set up in such a way that the fading in of the optical output of the image data is implemented with a step function $T_{FADING\ IN}(t)$, in which the light intensity LI of the image data output is increased stepwise, and/or in which the blurring of the image data output is reduced stepwise.

Advantageously, the step function $T_{FADING\ IN}(t)$ and/or $T_{FADING\ OUT}(t)$ is implemented with equidistant support points $t=t_n=t_0+(n-1)*\Delta t$, with $n=0, 1, 2, \ldots$ to a start time, and $\Delta t$ a predetermined time step.

Advantageously, the control unit is designed and set up in such a way that a frequency is determined at which the driver's viewing direction is directed to the output unit, wherein the fading out rate DOWN is increased as the frequency increases.

Advantageously, the control unit is designed and set up in such a way that a frequency is determined at which the driver's viewing direction is directed towards the output unit, wherein the fading out rate DOWN is increased and/or the fading in rate UP is reduced as the frequency increases.

Advantageously, the fading out rate DOWN and/or the fading in rate UP is changed in such a way that: UP>DOWN.

Advantageously, the control unit is designed and set up in such a way that, if the driver's determined viewing direction is directed towards the output device, the fading out of the optical output of the image data begins with a time offset $ZV_{DOWN}$.

Advantageously, the control unit is designed and set up in such a way that if the driver's determined viewing direction is directed towards the output device and away from the output device, the fading in of the optical output of the image data starts with a time offset $ZV_{UP}$.

A final aspect of the invention relates to a vehicle having a system as described above.

BRIEF DESCRIPTION OF THE DRAWING FIGURES

Figure 2:
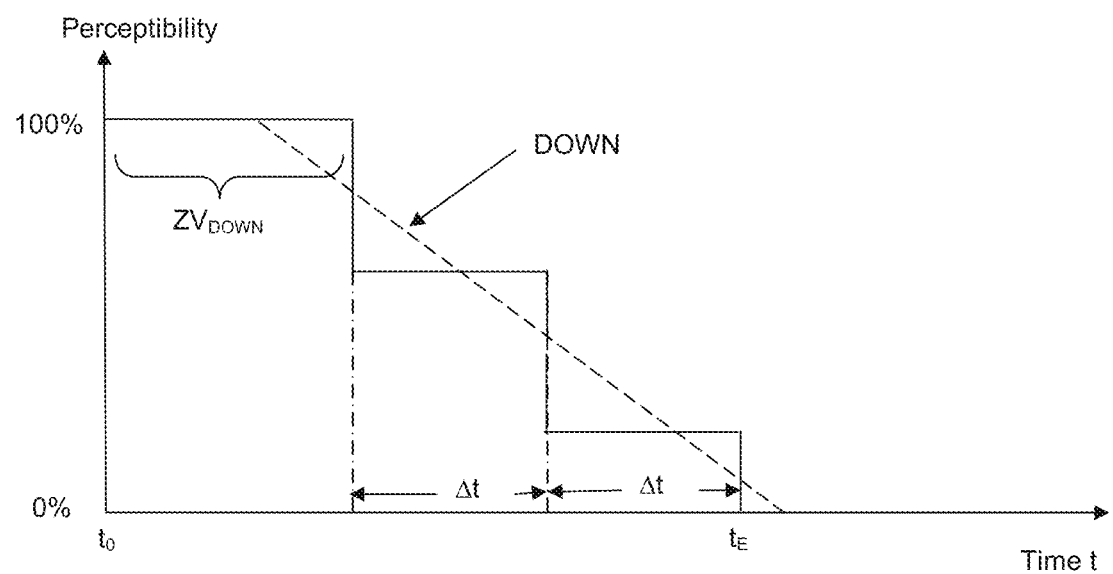
Figure 3:
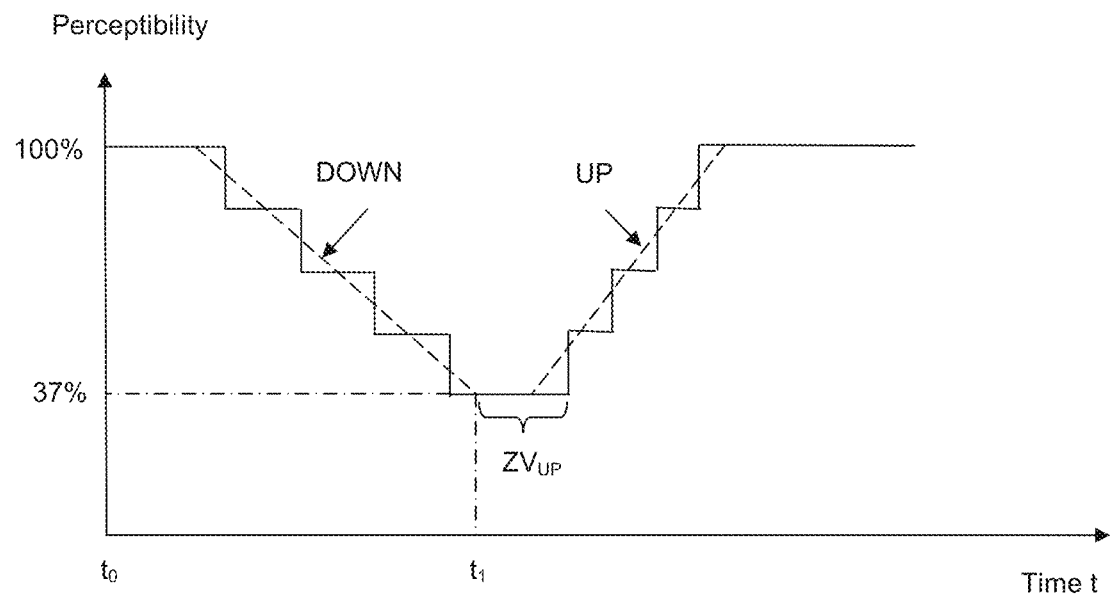
Figure 4:
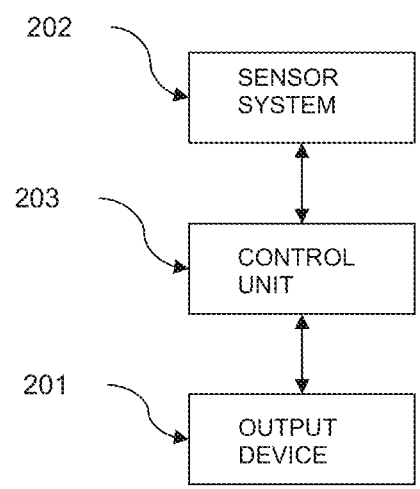

Further advantages, features and details emerge from the following description, in which—optionally with reference to the drawings—at least one exemplary embodiment is described in detail. Identical, similar and/or functionally identical parts are provided with the same reference numerals. Here are shown:

FIG. 1 a highly schematized sequence of a method according to the invention, FIG. 2 an example of a change in the perceptibility of the output image data, wherein the driver looks at the output device at one point in time and does not avert his/her gaze, FIG. 3 an example of a change in the perceptibility of the output image data, wherein the driver looks at the output device at one point in time and averts his/her gaze away from the output device again, and FIG. 4 a highly schematized structure of a system according to the invention.

DETAILED DESCRIPTION

FIG. 1 shows a highly schematized sequence of a method according to the invention for influencing an optical output of image data on an output device in a vehicle, with the following steps. In a step 101, a viewing direction of a driver of the vehicle is determined in the vehicle. In a step 102, if the determined viewing direction is directed to the output device, the optical output of the image data is faded out at an average fading out rate DOWN, wherein the fading out rate DOWN defines a temporal decrease in the optical perceptibility of the output image data by a human. In a step 103, if the determined viewing direction is directed towards the output device and is directed away from the output device, the optical output of the image data is faded in at an average fading in rate UP, wherein the fading in rate UP describes a temporal increase in the optical perceptibility of the output image data by a human. In particular, UP>DOWN applies.

FIG. 2 shows an example of a change in the perceptibility of the output image data, wherein the driver looks at the output device at a time $t_0$ and does not avert his/her gaze for a longer time, e.g., 10 seconds.

In the depicted diagram, the time t is indicated along the x axis and the perceptibility of the image data displayed on the output device is indicated along the y-axis as a percentage [%]. In the present case, the perceptibility of 100% corresponds to an optimal output of image data for the output device. At a perceptibility of 0%, the output image data cannot be perceived by a human.

As already described above, the perceptibility can be changed by, for example: changing the image brightness of the image data to be output on the output device and/or by changing the blur of the image data to be output. By way of example, the perceptibility of 0% corresponds to a "black" screen in which the image brightness of the image data to be output is zero, or it corresponds, for example, to a blur of the output image data that does not allow any recognizability of the image data to be output.

In the depicted graphic, the progression of the perceptibility of the image data to be output is depicted for the case where the image data to be output is initially displayed on the output device with a perceptibility of 100% and at time $t_0$ it is determined that the driver is looking at the output device.

However, the fading out 102 of the optical output of the image data to be output with an average fading out rate DOWN does not start at time $t_0$ but with a time offset $ZV_{DOWN}$, which is, for example, 2, 3 or 4 seconds.

The fading out 102 of the optical output of the image data is implemented in this exemplary embodiment with a step function $T_{FADING\ OUT}(t)$, in which a light intensity LI of the image data output is reduced stepwise and/or in which a blurring of the image data output is increased stepwise, such that the perceptibility of the image data to be output is reduced with an average fading out rate DOWN (represented by the dashed line). The step function $T_{FADING\ OUT}(t)$ is implemented here with equidistant support points $t=t_n=t_0+(n-1)*\Delta t$, wherein n=0, 1, 2, . . . to is a start time, and $\Delta t$ is a predetermined time step.

Of course, the fading out 102 of the optical output of the image data can also be performed with any other time function f(t).

The time span from $t_0$ to $t_E$ is advantageously 5 to 15 seconds.

FIG. 3 shows an example of a change in the perceptibility of the output image data, wherein the driver initially looks at the output device at time $t_0$ and turns his/her gaze away from the output device again at a time $t_1$. In the example shown, the time difference between $t_0$ and $t_1$ is too small for the perceptibility of the image data to be output to reach 0% as a result of fading out. The perceptibility of the output image data is 37% at time $t_1$.

The fading in 103 of the optical output of the image data occurs with a time offset $ZV_{UP}$, for example of 2 seconds with an average fading in rate UP. Fading in 103 of the optical output of the image data is also implemented with a step function $T_{FADING\ IN}(t)$, in which a light intensity LI of the image data output is increased stepwise, and/or in which a blur of the image data output is decreased stepwise. The following can be clearly seen: UP>DOWN, i.e., the reduction of the perceptibility occurs more slowly than the increase of the perceptibility.

FIG. 4 shows a highly schematized structure of a system according to the invention, with which image data can be output optically on an output device 201 in a vehicle, comprising a sensor system 202 arranged in the vehicle, which is designed and set up to determine a viewing direction of a driver of the vehicle, a control unit 203, which controls the output device 201, which is designed and set up such that, provided the determined viewing direction is directed towards the output device 201, the optical output of the image data is faded out at an average fading out rate DOWN, wherein the fading out rate DOWN defines a temporal decrease in the optical perceptibility of the output image data by a human, and if the determined viewing direction is directed towards the output device 201 and is directed away from the output device 201, the optical output of the image data is faded in at an average fading in rate UP, wherein the fading in rate UP describes a temporal increase in the optical perceptibility of the output image data by a human.

Although the invention has been further illustrated and explained in detail by preferred exemplary embodiments, the invention is not limited by the disclosed examples, and other variations can be derived therefrom by those skilled in the art without departing from the scope of protection of the invention. It is therefore clear that a plurality of possible variations exists. It is also clear that exemplary embodiments mentioned are really only examples, which are not to be understood in any way as limiting, for example, the scope of protection, the possible applications or the configuration of the invention. Rather, the preceding description and the figure description enable the person skilled in the art to implement the exemplary embodiments in a concrete manner, wherein the person skilled in the art, being aware of the disclosed idea of the invention, can make a variety of changes, for example with respect to the function or the arrangement of individual elements mentioned in an exemplary embodiment, without leaving the scope of protection defined by the claims and their legal equivalents, such as further explanations in the description.

The invention claimed is:

1. A method for controlling an optical output of image data on an output device in a vehicle, the method comprising:
   determining, in the vehicle, a viewing direction of a driver of the vehicle;
   fading out, responsive to determining that the viewing direction of the driver of the vehicle is directed to the output device, the optical output of the image data with an average fading out rate DOWN, wherein the fading out rate DOWN defines a temporal decrease in the optical perceptibility of the output image data by a human; and
   fading in, responsive to determining that the viewing direction of the driver is directed towards the output device and then is directed away from the output device, the optical output of the image data with an average fading in rate UP, wherein the fading in rate UP defines a temporal increase of the optical perceptibility of the output image data by the human, the method further comprising
   determining a frequency at which the viewing direction of the driver is directed towards the output device or the viewing direction of the driver is directed away from the output device, wherein the fading out rate DOWN is increased or the fading in rate UP is reduced as the determined frequency increases.

2. The method of claim 1, wherein the fading in rate UP is greater than the fading out rate DOWN.

3. The method of claim 1, wherein in which the fading out of the optical output of the image data is implemented with a step function $T_{FADING\ OUT}(t)$ in which a light intensity LI of the image data output is reduced stepwise or in which a blurring of the image data output is increased stepwise.

4. The method of claim 3, wherein the fading in of the optical output of the image data is implemented with a step function $T_{FADING\ IN}(t)$, in which a light intensity LI of the image data output is increased stepwise or a blurring of the image data output is reduced stepwise.

5. The method of claim 4, wherein the step function $T_{FADING\ OUT}(t)$ or $T_{FADING\ IN}(t)$ is implemented with equidistant support points $t=t_n=t_0+(n-1)*\Delta t$, with $n=0, 1, 2, \ldots$ to is a start time, and $\Delta t$ is a predetermined time step.

6. The method of claim 1, wherein the fading out rate DOWN is increased with increasing frequency.

7. The method of claim 1, wherein the fading out of the optical output of the image data starts at an average fading out rate DOWN with a time offset $ZV_{DOWN}$ responsive to the determined viewing direction being directed towards the output device.

8. The method of claim 1, wherein the fading in of the optical output of the image data begins with a time offset $ZV_{UP}$ responsive to the determined viewing direction of the driver being initially directed towards the output device and then is directed away from the output device.

9. A system in a vehicle, the system comprising:
   an output device, in the vehicle, configured to optically outputs image data;
   a sensor system, in the vehicle, configured to determine a viewing direction of a driver of the vehicle; and
   a control unit coupled to the sensor system and the output device, wherein the control unit is configured to control the output device in such a way that
   the optical output of the image data of the output device is faded out, responsive to determining that the viewing direction of the driver of the vehicle is directed to the output device, with an average fading out rate DOWN, wherein the fading out rate DOWN defines a temporal decrease in the optical perceptibility of the output image data by a human;
   the optical output of the image data of the output device is faded in, responsive to determining that the viewing direction of the driver is directed towards the output device and then is directed away from the output device, with an average fading in rate UP, wherein the fading in rate UP defines a temporal increase of the optical perceptibility of the output image data by the human; and
   a frequency at which the viewing direction of the driver is directed towards the output device or the viewing direction of the driver is directed away from the output device is determined, wherein the fading out rate DOWN is increased or the fading in rate UP is reduced as the determined frequency increases.

* * * * *